United States Patent [19]
Barry

[11] 3,884,441
[45] May 20, 1975

[54] OUTLET BOX MOUNTING DEVICE

[76] Inventor: Robert L. Barry, 2916 E. Randolph Rd., Silver Spring, Md. 20904

[22] Filed: Mar. 22, 1974

[21] Appl. No.: 453,995

[52] U.S. Cl. ............... 248/205 R; 220/3.5; 248/27; 248/DIG. 6
[51] Int. Cl. ........ H02g 3/08; H02g 3/18; H02g 3/12
[58] Field of Search ............ 248/27, DIG. 6, 205 R; 174/58, 57; 220/3.5, 3.6, 3.9, 3.7

[56] References Cited
UNITED STATES PATENTS

| | | | |
|---|---|---|---|
| 1,519,735 | 12/1924 | Kruse | 220/3.9 |
| 1,850,616 | 3/1932 | Barnett | 220/3.9 |
| 2,143,278 | 1/1939 | Myers | 248/DIG. 6 |
| 2,286,898 | 6/1942 | Cover | 220/3.6 |
| 2,448,359 | 8/1948 | Davison | 248/27 |
| 3,639,745 | 2/1972 | Shiki | 248/27 X |
| 3,710,972 | 1/1973 | Barry | 220/3.6 |

*Primary Examiner*—J. Franklin Foss
*Attorney, Agent, or Firm*—John N. Randolph

[57] ABSTRACT

A device for use in mounting an outlet box in a wall opening, including a spring clip which is detachably secured to a wall of a conventional outlet box and which supports a spring finger which is adjustably secured to a shank or leg of the spring clip. The resilient finger has a free end which is normally spaced outwardly from the clip leg and which is capable of yielding against the clip leg in passing, with a portion of the box, through the wall opening, and which thereafter springs outwardly to engage the inner side of the wall, to cooperate with conventional wall engaging elements which are carried by the box and which engage the outer side of the wall for securing the box to the wall.

6 Claims, 5 Drawing Figures

OUTLET BOX MOUNTING DEVICE

SUMMARY

It is a primary object of the present invention to provide a unique mounting device capable of being utilized with any conventional outlet box and which may be quickly and easily applied thereto or removed therefrom, without the use of tools, and which device will function effectively, in conjunction with wall engaging elements of the box, for securely mounting the box in a wall opening.

Another object of the invention is to provide such a mounting device including a wall engaging element which is adjustably positioned on the device for effectively engaging the inner sides of walls of different thicknesses.

Still a further object of the invention is to provide a device which requires no modification of the box for mounting the device thereon and wherein the wall functions, when the device is in an operative position, to effectively retain the device securely attached to the box.

Various other objects and advantages of the invention will hereinafter become more fully apparent from the following description of the drawing, illustrating a presently preferred embodiment thereof, and wherein:

DESCRIPTION OF THE PREFERRED EMBODIMENT

Figure 1:
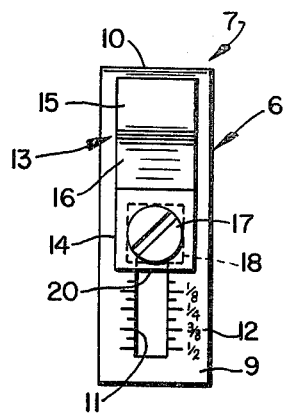
FIG. 1 is a side elevational view of the outlet box mounting device.

Referring more specifically to the drawing, the mounting device in its entirety and comprising the invention is designated generally 6 and includes a spring clip 7 having a short leg 8 and a long leg 9. The clip 7 is formed of a single strip of metal or other suitable material which is turned back upon itself at 10 to form the short leg 8 which is bowed inwardly toward the leg 9 and which has an outwardly flared terminal. The long leg 9 is provided with an elongated opening 11 which extends from intermediate of its ends to adjacent the end thereof disposed remote from the bend 10. The outer side of the leg 9 is inscribed with linear graduations 12.

A wall engaging element 13, formed from an elongated strip of a resilient material, such as a spring metal, has laterally offset end portions 14 and 15 which are connected by an intermediate portion 16 which is inclined relative to said end portions. A screw 17 extends through an opening of the end portion 14, through the opening 11 and engages a thin flat nut 18 which is disposed against the other or inner side of the leg 9.

A pair of the mounting devices 6 are utilized with a conventional outlet box 19. The screws 17 are initially loosened so that the elements or fingers 13 can be slid longitudinally of the legs 9 to position the outer edges 20 in alignment with a selected graduation 12, corresponding to the thickness of a wall 21 in which the box 19 is to be mounted. The screw 17 of each device 6 is then tightened for clamping the fingers 13 in these selected adjusted portions with each finger extending longitudinally of the leg 9 and toward the end of the leg disposed remote from the opening 11. The two spring clips 7 are then applied to opposite walls 22 of the box 19 with said clips 7 engaging over said walls at the open end of the box, and with the resilient legs 8 engaging the inner sides of the walls 22 and the legs 9 engaging the outer sides of said walls and extending longitudinally thereof. The legs 8 and 9 yieldably engage the walls 22 for detachably securing the devices 6 thereon. The other two walls 23 of the box 19 are provided with conventional wall engaging elements 24, at the open end of the box 19, and which may be of the adjustable type.

Figure 2:
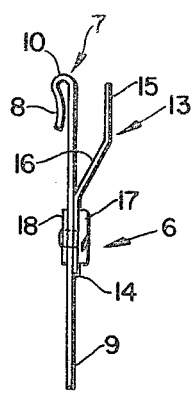
FIG. 2 is an edge elevational view thereof, looking from left to right of FIG. 1.
Figure 3:
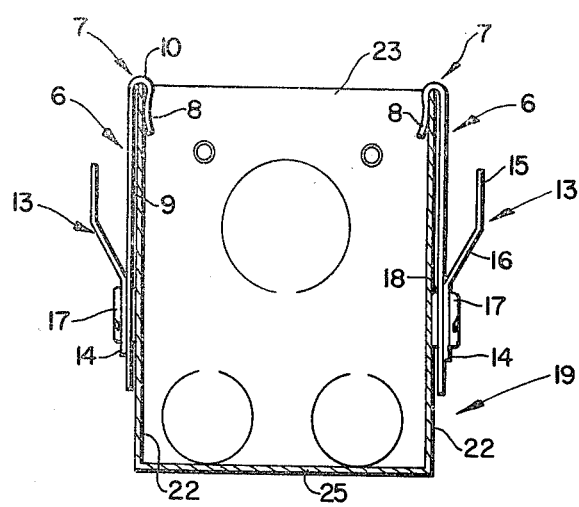
FIG. 3 is a view showing a pair of the devices in edge elevation applied to a conventional outlet box, shown in longitudinal section.
Figure 4:
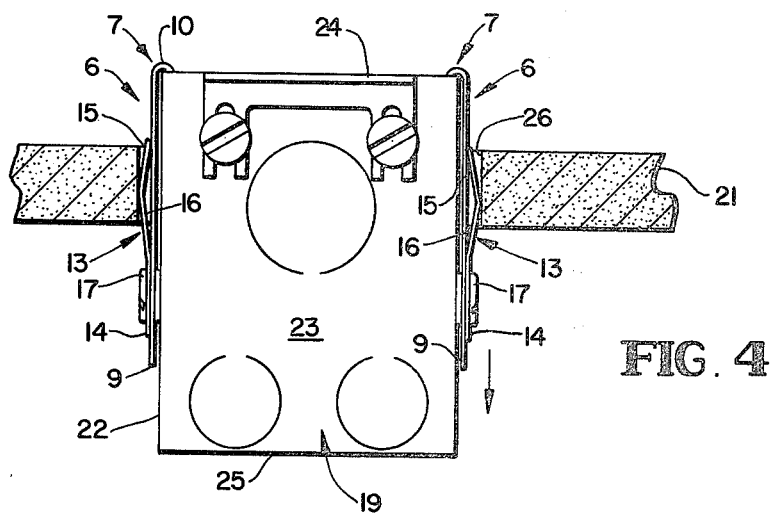
FIG. 4 is an elevational view of the outlet box, with the two mounting devices applied thereto and showing the box being passed through a wall opening.
Figure 5:
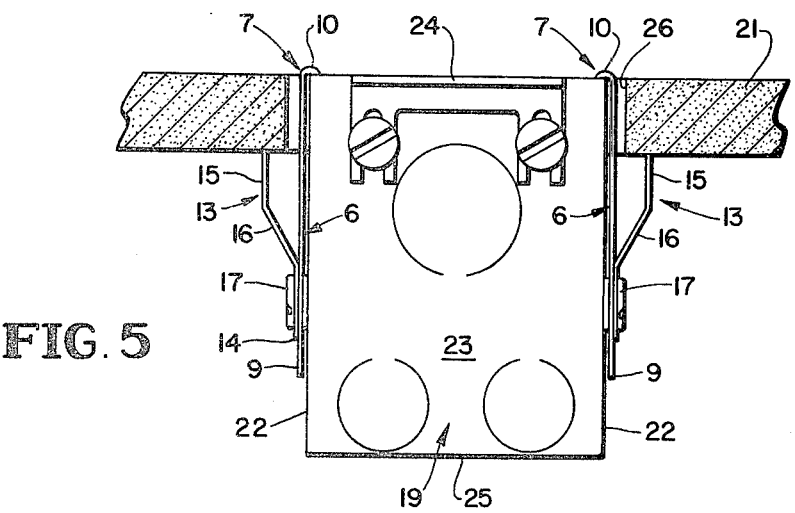
FIG. 5 is a view similar to FIG. 4 but showing the box secured in the wall opening by the mounting devices and by one of a pair of conventional wall engaging elements carried by the box.

The other inner or closed end 25 of the box 19 is advanced through an opening 26 of the wall 21. The opening 26 is of such a size that the intermediate portions 16 engage portions of said wall surrounding the opening for deflecting the portions 16 and end portions 15 inwardly toward the legs 9, to permit said portions 15 and 16 to pass through the opening 26, as illustrated in FIG. 4. When the portions 15 and 16 clear the opening 26, as seen in FIG. 5, at which time the wall engaging elements 24 will be in contact with portions of the outer side of the wall 21 to prevent further inward movement of the box through the opening 26, said spring fingers 13 will spring outwardly and back to their normal positions of FIGS. 1 to 3, so that the terminals of the finger portions 15 will abut the inner side of the wall 21 to prevent the box 19 from being withdrawn from the opening 26, and to cooperate with the elements 24 for securing the box to the wall 21 and in the opening 26. It will also be noted that the finger portions 15, by engaging the inner side of the wall 21, prevent the clips 7 from being detached from the walls 22, so that the wall 21 thus functions with the spring fingers for effectively retaining the mounting devices 6 correctly applied to the box 19.

Various modifications and changes are contemplated and may be resorted to, without departing from the function or scope of the invention.

I claim as my invention:

1. A mounting device for an outlet box comprising a spring clip resiliently gripping an outlet box wall at the open end of the box and having a long leg disposed on the outer side of said wall and extending longitudinally thereof, an elongated finger, means securing said finger adjacent one end thereof to the outer side of said clip leg, said finger extending back along the leg from said end and having an opposite end spaced outwardly from said clip leg for engaging the inner side of a wall in an opening of which the box is mounted for cooperation with wall engaging elements of the box which engage the outer side of the wall for securing the box in the wall opening.

2. An outlet box mounting device as in claim 1, said finger having an intermediate portion extending obliquely away from said first mentioned end of the finger for offsetting the other free end of the finger outwardly from said leg.

3. An outlet box mounting device as in claim 2, said finger being formed of a resilient material whereby the free end and intermediate portion thereof may yield inwardly to pass through the wall opening and thereafter spring outwardly for engagement of the free end of the finger with the inner side of the wall.

4. An outlet box mounting device as in claim 3, said clip leg having an elongated opening, said means comprising threaded clamping means engaging said first mentioned finger end for adjustably clamping the finger to the clip leg in different longitudinally adjusted positions of the finger relative to said clip leg.

5. An outlet box mounting device as in claim 4, and said clip leg having linear graduations thereon to facilitate positioning the finger for engagement with walls of different thicknesses.

6. An outlet box mounting device as in claim 3, and a second mounting device engaging the box wall disposed opposite to the wall engaged by said aforementioned mounting device.

* * * * *